United States Patent [19]

Steward

[11] 4,043,856
[45] Aug. 23, 1977

[54] APPARATUS AND METHOD FOR PRODUCING FLEXIBLE PLASTIC TUBING

[75] Inventor: William L. Steward, Costa Mesa, Calif.

[73] Assignee: Hudson Oxygen Therapy Sales Company, Temecula, Calif.

[21] Appl. No.: 595,119

[22] Filed: July 11, 1975

[51] Int. Cl.² ........................................ B31C 1/00
[52] U.S. Cl. ................................ 156/195; 156/428; 156/429
[58] Field of Search ............... 156/184, 187, 195, 143, 156/144, 425, 428, 429, 430, 431; 93/80; 425/391, 319, 322

[56] References Cited

U.S. PATENT DOCUMENTS

| | | | |
|---|---|---|---|
| 2,321,738 | 6/1943 | Farny | 156/195 X |
| 2,516,864 | 8/1950 | Gilmore et al. | 156/143 |
| 2,994,104 | 8/1961 | Mittag | 156/195 |
| 3,173,822 | 3/1965 | Rigaut | 156/429 |
| 3,271,064 | 9/1966 | Hall | 156/143 X |
| 3,706,624 | 12/1972 | Rinker | 156/195 X |
| 3,740,294 | 6/1973 | Wienand et al. | 156/195 X |
| 3,793,938 | 2/1974 | Haass | 156/429 X |
| 3,890,181 | 6/1975 | Stent et al. | 156/195 X |
| 3,910,808 | 10/1975 | Steward | 156/429 |

*Primary Examiner*—David A. Simmons
*Attorney, Agent, or Firm*—Jerry R. Seiler

[57] ABSTRACT

An improved apparatus for producing a flexible plastic corrugated tubing includes a pair of relatively short, slender rotating mandrels extending substantially parallel to one another and separated along a vertical plane and around which a continuous ribbon of molten plastic is spirally wrapped to form the tubing. In another embodiment, a plurality of elongated rollers spaced apart axially form a tunnel therebetween through which the tubing is directed from the mandrel at least one of the rollers being rotatably driven to drive the tubing through the tunnel.

12 Claims, 7 Drawing Figures

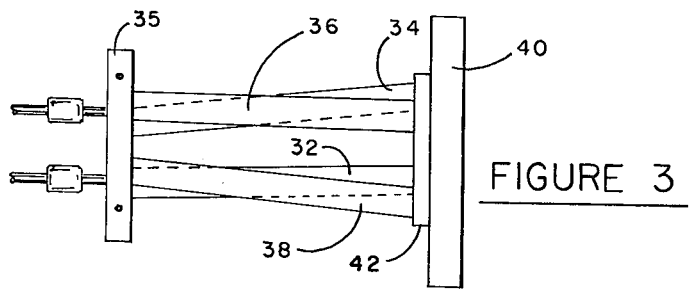
FIGURE 3
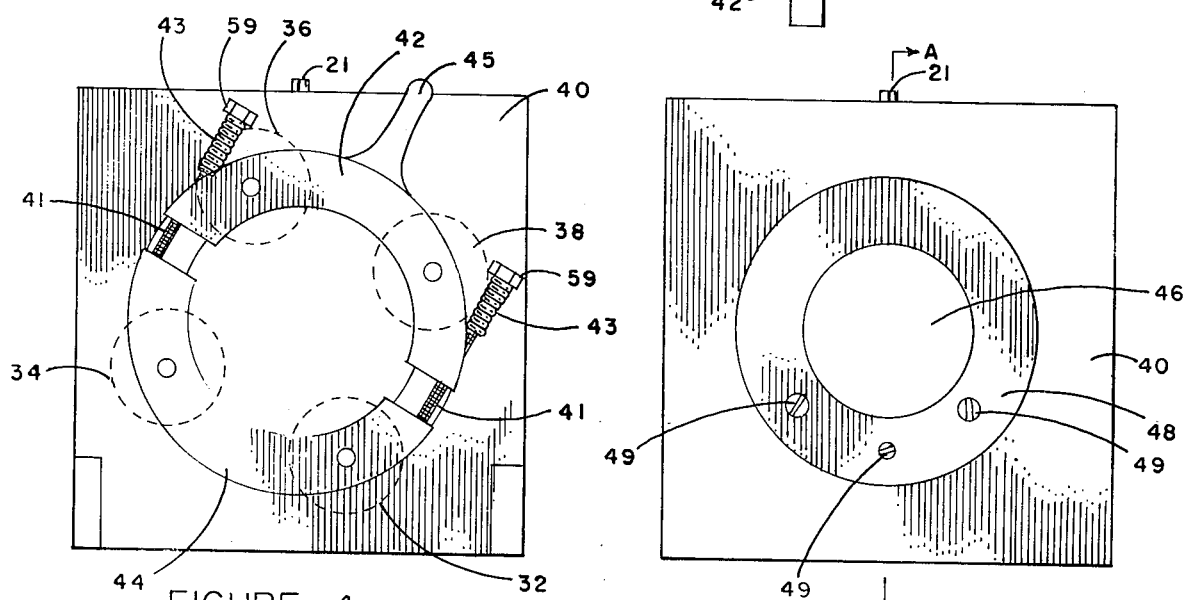
FIGURE 4
FIGURE 5
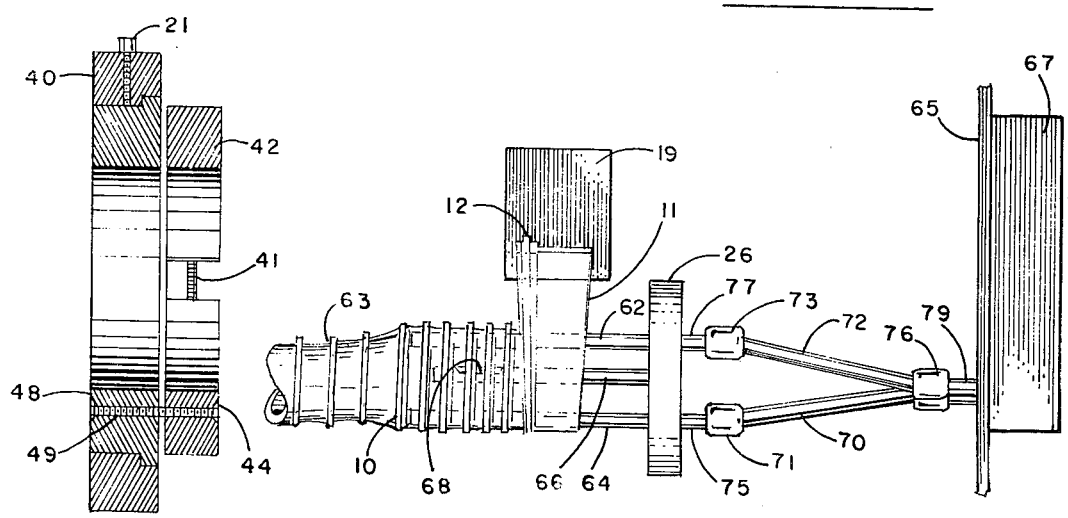
FIGURE 6
FIGURE 7

APPARATUS AND METHOD FOR PRODUCING FLEXIBLE PLASTIC TUBING

BACKGROUND OF THE INVENTION

Plastic corrugated and flexible tubing and especially inexpensive medical tubing which can be used as part of or in conjunction with disposable respiratory therapy devices such as oxygen masks, volume ventilator circuits, nebulizers, and the like have been of recent interest. Especially advantageous is corrugated tubing which is quite flexible and yet in lightweight and strong and incorporates a smooth interior surface as opposed to a corrugated interior. Such a tubing is described in my co-pending application Ser. No. 595,115, filed July 11, 1975.

Apparatus for producing types of flexible corrugated plastic tubing have been disclosed in U.S. Pat. Nos. 3,301,734 and 3,706,624. Both of these patented apparatus utilize a system in which a continuous strip or ribbon of molten thermosplastic is wrapped spirally on a mandrel to form the corrugated tubing. The apparatus of the present invention is an improvement and designed to produce a tubing such as described in my aforesaid co-pending application. Specific details and advantages of such an apparatus will be evident from the following detailed description.

SUMMARY OF THE INVENTION

The improved apparatus of the invention for producing a corrugated flexible plastic tubing utilizes a pair of relatively short, slender rotating mandrels which are spaced apart from one another along a single substantially vertical plane. A continuous strip or ribbon of molten thermoplastic material is passed first over the upper rotating mandrel and then directed around the lower mandrel whereby successive convolutions of the molten material are overlapped while in somewhat molten condition thereby becoming sealed to form the tubing. Located between the two vertically spaced horizontal mandrels is a water directing member or nozzle whereby water is directed into the interior of the tubing as it is first formed on the mandrels thereby cooling the molten thermoplastic at an early stage in the process while at the same time providing a film of water between the tubing and interior mandrel surfaces on which the tubing is formed.

In another embodiment, a plurality of elongated rollers are spaced at the opposite end of the apparatus from the mandrel assembly and extend generally along the axis of the hollow tubing as it is removed from the mandrels. These rollers are spaced apart to form a passageway or tunnel between them and through which the tubing is directed. At least one of the rollers is rotatably driven along its elongated axis and its contact with a spiral rib on the tubing causes the latter to be driven from the apparatus. At least one of the rollers is biased toward the other rollers so that each of the rollers contacts the spiral rib on the outer surface of the tubing. The apparatus also preferably embodies a feature wherein the rollers are elevated somewhat from the mandrel assembly so that water inside the tubing is drained gravitationally whereby the tubing needs little or no drying. Other advantages as well as the ease of tubing production utilizing the apparatus of the invention will be readily understood from the detailed description.

BRIEF DESCRIPTION OF THE DRAWINGS

FIG. 3 is a top plan view of the roller assembly of FIG. 2, the lower rollers being shown partially in phantom;

FIG. 4 is an interior view of the rear end plate assembly of the apparatus showing the position of the rollers attached thereto in phantom;

FIG. 5 is an exterior end view of the plate assembly of FIG. 4;

FIG. 6 is a sectional elevation of the end plate assembly of FIG. 5 taken along lines A—A; and FIG. 7 is a side view showing the mandrel assembly portion of the apparatus and mandrel drive means.

DETAILED DESCRIPTION OF THE INVENTION

Figure 1:
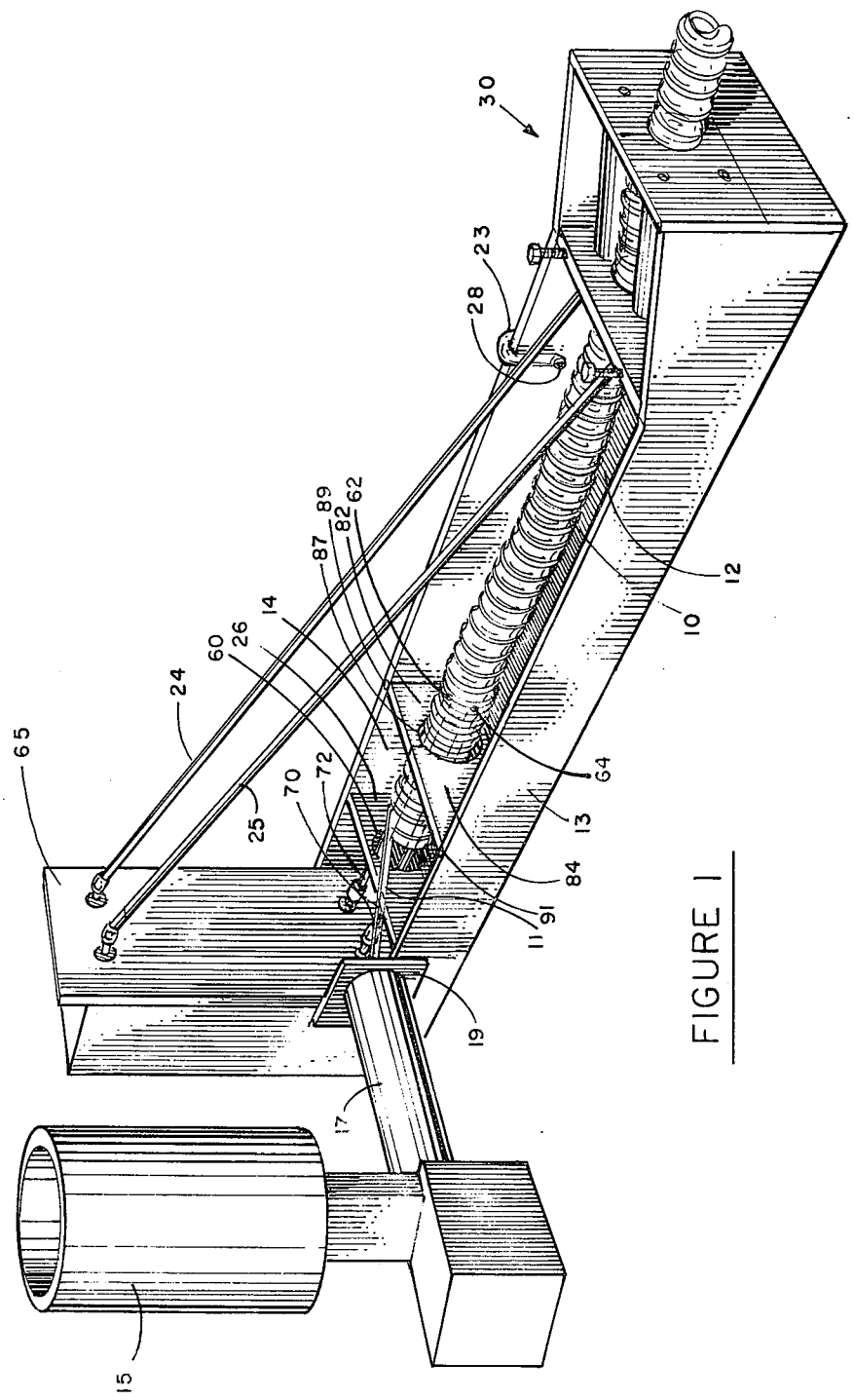
FIG. 1 is a perspective view showing the apparatus of the invention partially cut away.

Referring first to FIG. 1, there is shown in perspective the apparatus for forming the tubing according to the invention. A molten thermoplastic strip or ribbon 11 is extruded from a conventional extruder 17 which incorporates a heater or heaters around a jacket surrounding a screw for advancing molten thermoplastic to the extruder head 19. The material utilized for the tubing may be any suitable thermoplastic such as polyvinyl chloride and especially polyethylene or ethylene vinyl acetate copolymers which is placed in hopper 15. The extruded ribbon is wrapped on a mandrel assembly 60 by overlapping successive and adjacent convolutions spirally in a manner as described in my aforesaid co-pending application. The completed tubing 10 is shown as it advances along the apparatus between mandrel assembly 60 and roller assembly 30. Drive rods 70 and 72 rotate the respective upper and lower mandrels while drive rods 24 and 25 turn a pair of upper rollers on the roller assembly 30. These components and the respective assemblies will be more fully explained hereinafter. A main trough 13 supports a front wall 26 from which the rotating mandrels extend and at the opposite end the roller assembly. In the specific embodiment shown, the main trough includes a first chamber 12 and a second chamber 14, separated by opposite and movably hinged doors 82 and 84 having a common port 87 which communicates with both chambers. Mandrels 62 and 64 extend through the port. The specific advantages of these features will be more fully explained hereinafter.

ROLLER ASSEMBLY

Figure 2:
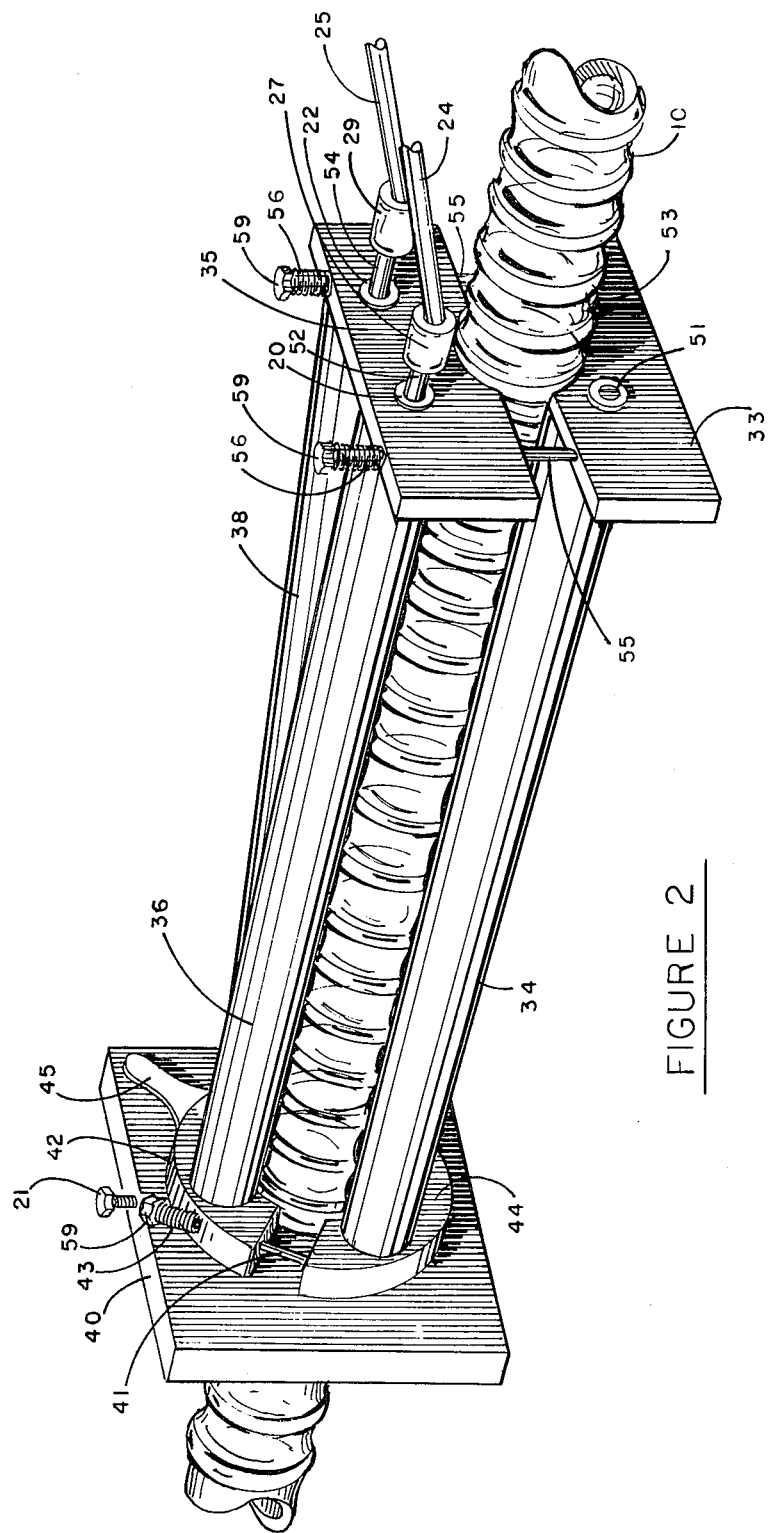
FIG. 2 is a side view in perspective showing a roller assembly embodiment of the apparatus for removing the tubing.

The roller assembly 30 shown generally in FIG. 1 is illustrated more particularly in FIGS. 2 and 3, FIG. 2 being viewed from the end of the assembly in which the tubing is first received from the mandrels. In the specific embodiment shown, four rollers are utilized (See FIG. 3), the two lower rollers 32 and 34 rotating freely between the end plate assemblies with the upper rollers 36 and 38 being driven. In addition to the four rollers, the roller assembly includes a lower front plate 33 which is secured near the end of main trough 13 (FIG. 1) and an upper front plate 35. The two lower rollers 32 and 34 are secured on shafts extending from each roller end into bearing sleeves 51 and 53 secured in lower plate 33. The opposite shaft ends of these lower rollers similarly extend into bearing sleeves mounted in lower roller support 44 of rear end plate 40. Accordingly, the lower rollers are free to rotate between lower front plate 33 and lower roller support 44.

Upper front plate 35 is movably mounted on a pair of upwardly extending pins 55 which pins are secured on lower front plate 33 and extend through enlarged bore holes in the upper front plate so that the latter can slide up and down on the pins. Upper rollers 36 and 38 are secured on shafts 52 and 54. The forward shaft ends extend through bearing sleeves 20 and 22 mounted in upper front plate 35 and are secured to flexible elbows 27 and 29. Drive rods 24 and 25 are power driven and cause rotation of the elbows, shafts and upper rollers. The opposite ends of the upper roller shafts are rotatably secured in the bearings mounted in upper roller support 42.

Observing further FIGS. 4, 5 and 6, rear plate 40 has an annular ring 48 rotatably mounted within a circumferential bore extending through approximately the center of the plate. Lower roller support 44 is secured to annular ring 48 by a plurality of bolts 49 or similar means while upper roller support 42 is mounted on guide pins 41 which pins are connected to the lower roller support 44 and extend through enlarged bore holes in the upper roller support so that the latter can move up or down on the pins in a manner as previously explained regarding front upper plate 35.

Observing both FIGS. 2 and 4, the upper portion of each of the pins 55 and 41 is threaded for engaging a nut 59 on each of the upper threaded pin ends. A spring 56 is provided between the nut and upper front plate 35 on each of the pins 55 so as to force or bias the upper front plate downwardly. Similarly springs 43 are placed between nuts 59 and upper roller support 42 on the pins 41 for biasing the upper roller support diwnwardly. Since the upper rollers 36 and 38 are secured between upper front plate 35 and upper roller support 52, with the plate and roller support being biased downwardly, and guided along pins 55 and 41 respectively, the two upper rollers also biased downwardly and urged against tubing 10 passing through the tunnel provided between the four rollers and will in turn urge the tubing against the freely rotating lower rollers. The force of the bias can also be varied by turning nuts 59 on their respective threaded pins so as to further compress or expand the springs to the desired extent.

Back plate 40 also incorporates a threaded screw 21 which extends through the upper portion of the plate. The screw can be tightened to secure rotatable ring 48 when the ring is in the desired position. For example, observing FIGS. 2, 4 and 5, since ring 48 can be rotated within plate 40, such rotation will cause rotation of roller supports 42 and 44 to which the shafts on the ends of each of the four rollers are rotatably engaged within bearing sleeves as previously explained. Thus, rotation of ring 48 will cause the axis of each of the rollers to be moved angularly as the ring is turned. Conveniently, for this purpose, a handle 45 is attached to the upper roller support 42 so that an operator need only grasp the handle and move it to a desired position and tighten screw 21 forcing against the interior surface of ring 48 thereby securing it from further free movement.

Observing also FIGS. 2 and 7, since adjacent convolutions of thermoplastic ribbon 11 are overlapped in a continuous manner, this overlap causes spiral revolution of the adjacent convolutions and concomitantly, rib 63 extends spirally along the tubing. As the rollers contact this spiral rib, the upper driven rollers cause the tubing to be rotated as it passes through the roller tunnel. Moreover, the axis of the rotating rollers is at an angle of less than 90° from the inclined angle of the spiral rib. Because of the difference between those angles, the rib is caused to be wound through the roller tunnel and is thereby directed from the apparatus in a screw like manner. Further, by varying the axis angle of the rollers by rotating ring 48 and concomitantly roller supports 44 and 42 and the ends of the rollers attached therein the rate at which tubing 10 winds through the rollers from the mandrels is thereby varied which in turn causes a change in the pitch of the spiral rib or the distance between adjacent convolutions. As the axis of the rollers is changed to increase the angle between that axis and the spiral rib inclination and as it approaches 90° the adjacent rib convolutions will close up or the distance between the rib convolutions will be made smaller thereby slowing the rate at which the tubing is wound through the tunnel at a given roller speed. However, observing FIG. 2, by moving handle 45 to the right or clockwise, this will decrease the angle between the axis of the rollers and the spiral rib inclination thereby increasing the rate at which the tubing is wound through the assembly and increasing the distance between adjacent rib convolutions. Where the distance between adjacent ribs is to be shortened, the operator will move handle 45 counterclockwise, until the desired pitch is achieved and then tighten set screw 21 to lock ring 48 in that desired position. It has been observed that the change in the pitch or distance between the adjacent rib convolutions as the ribbon is wrapped around the mandrel as shown in FIG. 7, is quickly achieved, almost instantaneously when the handle 45 is moved in one direction or the other so that an operator has fine control over the tubing characteristics utilizing the features of the roller assembly as described herein.

Observing again FIG. 1, it will be noted that drive shafts 24 and 25 which drive upper rollers 36 and 38 as previously explained will be powered by a motor on the apparatus. The motor may be the same as that used for driving the mandrels, it being understood however, that a different rotation rate between the driven rollers and the driven mandrels may be desired. For this purpose, a single motor can drive the mandrels at one speed and utilizing gears, drive shafts 24 and 25 for the roller assembly at a different speed.

Although the embodiment described incorporates driven upper rollers and freely rotating lower rollers, the latter may instead be powered. Moreover, the number of rollers as well as powered and freely rotating rollers may be varied so long as at least one roller is driven. The length of the rollers is not especially critical. However, where flattened and fittings are formed on the tubing, as will be explained hereinafter, by flattening out the ribs, the rollers should be longer than an end fitting in order that some rib convolution is passing through the roller assembly. Otherwise contact of only a flattened tubing or end fitting would cause substantial change in the rate at which the tubing is driven through the roller assembly in turn upsetting the distance between adjacent convolutions as the tubing is formed on the mandrel assembly.

MANDREL ASSEMBLY

FIG. 7 illustrates the mandrel assembly and drives on which plastic corrugated tubing 10 is formed. Also noting FIG. 1, from extruder head 19 a ribbon 11 of hot melten thermoplastic resin is extruded through die orifice 12 having the desired cross-sectional shape of the tubing but enlarged as disclosed in my aforesaid co-pending application. The die orifice is elevated somewhat above the upper mandrel and as the molten thermoplastic is wrapped around the two rotating mandrels it is drawn to a fraction of its extruded size although its cross-sectional shape is substantially maintained. Upper and lower mandrels 62 and 64 respectively extend approximately the same length from wall 26 and which mandrels are preferably located along a vertical plane. Thus, mandrel 62 lies directly above mandrel 64. The surface of these mandrels is preferably smooth and they are rotated at substantially identical speeds by motor 67 acting through drive rods 70 and 72. The mandrels extend from wall 26 and are rotated through internal bearings in the wall. The mandrels are driven by front connecting rods 77 and 75 acting through flexible elbows 71 and 73 at one end respectively of each of the drive rods 70 and 72 and the other end by flexible elbows 76 which are rotated by drive shafts 79 driven by motor 67. Preferably the motor may be of variable speed but such a feature is not necessary so long as a proper rotational speed is imparted to the mandrels.

It will be noted in FIG. 7 that the initially wrapped molten thermoplastic ribbon achieves a somewhat oblong initial shape on the mandrels until it is directed off the mandrels where the tubing assumes its normal tubular shape. In other words, the distance between the upper and lower surfaces of mandrels 62 and 64 is greater than the internal diameter of the completed tubings. The specific distance between the two mandrels depends on the desired diameter of the tubing. The length of mandrels need not be over about 4 to 8 inches, it being understood that between about 2 and about 5 overlapping adjacent convolutions of the spirally wrapped ribbon will be formed on about each inch of the mandrel length. As shown in FIG. 6, only a portion of the mandrel length is used for forming the tube. Further, if the mandrels are excessively long it may cause permanent deformation of the tubing since it is cooled substantially before it passes the mandrel ends and may be unable thereafter to recover its desired circular cross-sectional shape. The mandrels are preferably slender and rod-like, having diameters between about ⅛ and about ¾ inch although such a diameter is not critical so long as the proper mandrel lengths and separation are provided.

Extending between mandrels 62 and 64 is a conduit or pipe 66 having one or more orifices or ports 68 from which water is directed into the interior of the formed tubing. The presence of the water flowing into the tubing as it is formed is necessary in order to cool the molten thermoplastic, giving it more stability as it is directed from the mandrels where it is further gradually cooled either by water in the trough or simply by being exposed to the cooler ambient air. In addition to the cooling effect of water on the interior of the newly formed tubing, there is provided a film between the tubing interior and surfaces of the mandrels which film allows the tubing to ride freely on and around the rotating mandrels. This film of water allows the rate of rotation of the tubing on the mandrels as it is formed to be somewhat independent from the specific rate of mandrel rotation so that there is not necessarily any given or fixed ratio between these two rotational rates.

In FIG. 1 trough 13 is divided between first chamber 12 and second chamber 14 which are separated by doors 82 and 84. The doors are secured on the trough sides by hinges 89 and 91 respectively on which hinges the doors can be pivoted between a closed position shown and an open position. The doors also incorporate a common port 87 through which the mandrel ends extend and from which the formed tubing is directed as it travels along toward the roller assembly. A water supply pipe 23 directs water into first chamber 12 through orifice 28 and is used where water is an important factor in producing the tubing. For example, certain types of ethylene polymers or ethylene vinyl acetate copolymers may crystallize or otherwise take on undesirable properties including loss of flexibility, become hardened or brittle, etc., if the plastic tubing is cooled too rapidly during the process. Thus, it may be desirable to maintain a water level in the first chamber 12 so that the tubing will be at least partially immersed. An appropriate water level is maintained by a drain system, in the first chamber with the level being varied by continuously removing the water at a desired rate.

Second chamber 14 is provided with a drain (not shown) for removal of water flowing from port 87 as well as water draining back from the tubing and introduced therein via pipe 66. The drain may be connected to a pump for recirculating the water to chamber 12 via supply pipe 23. Preferably roller assembly 30 is elevated somewhat from the mandrel assembly in order to drain water gravitationally from the tubing. In this manner although water may accumulate in the tubing between the mandrel and roller assemblies, with the latter being elevated somewhat, water in the tubing will be drained toward the mandrel assembly thereby obviating the need for separately drying or draining tubing directed from the rollers. Moreover, water accumulating in the tubing will cause it to sag somewhat thereby insuring further immersion in the water bath in first chamber 12, at least where there is sufficient distance between the assemblies. On the other hand, where water immersion is not important to the process, doors 82 and 84 may be opened or eliminated so that separate chambers are not provided. Also, in order to fully drain first chamber 12, the doors may be opened and the water drained in chamber 14 as previously explained.

Other advantages as well as modification of the apparatus and methods of its use within the purview of the invention will be evident to those skilled in the art.

I claim:

1. In an apparatus for producing a flexible plastic corrugated tubing having rotating mandrel means on which a continuous ribbon of molten plastic is spirally wrapped with successive adjacent convolutions being partially overlapped and having a spiral rib extending convolutely along the exterior surface, the improvement comprising:
    a plurality of elongated rollers being axially spaced apart to form a passageway therebetween through which said tubing is directed from said mandrel means said plurality of said rollers engaging said rib of said tubing and wherein at least one of said rollers is rotatably driven along its elongated axis, and means for increasing and decreasing the angle between the roller axes and the rib for decreasing and increasing, respectively, the distance between adjacent rib convolutions.

2. The apparatus of claim 1 wherein the opposite ends of said rollers are secured between first and second plate members and include means for varying the axial displacement of one of said opposite ends of said rollers relative to the other end.

3. The apparatus of claim 1 wherein at least one of said rollers is biased toward the other of said rollers along its length.

4. The apparatus of claim 2 wherein the first one of said plates includes a circumferentially displaceable segment to which first ends of said rollers are secured whereby said first end of each of said rollers can be displaced axially relative to second ends thereof by moving said displaceable segment.

5. The apparatus of claim 4 wherein said rollers comprise a pair of upper rollers and a pair of lower rollers.

6. The apparatus of claim 5 wherein the second plate comprises an upper and lower half, the second end of the upper rollers being secured to said upper plate half and the second end of the lower rollers being secured to said lower plate half.

7. The apparatus of claim 6 wherein said upper plate half is biased toward said lower plate half.

8. The apparatus of claim 5 wherein said segment comprises an upper and lower half, the second end of the upper rollers being secured to said upper plate half and the second end of the lower rollers being secured to said lower plate half.

9. In an apparatus for producing flexible plastic corrugated tubing having an inclined spiral rib extending convolutely along the exterior rib surface by extruding a continuous molten thermoplastic ribbon and wrapping said ribbon around a mandrel in successive convolutions and partially overlapping adjacent convolutions to form said tubing the improvement comprising:

a pair of power driven rotating and smooth continuous surfaced parallel mandrels spaced apart along a vertical plane, a roller assembly comprising a plurality of elongated rollers being axially spaced apart to form a passageway therebetween through which said tubing is directed from said mandrel means said plurality of said rollers engaging said tubing and wherein at least one of said rollers is rotatably driven along its elongated axis, and means for changing the angle of the elongated axes of said rollers relative to the inclination of said rib thereby changing the distance between adjacent convolutions of said rib.

10. The apparatus of claim 9 wherein said roller assembly is elevated from the mandrels.

11. In a method for producing flexible plastic corrugated tubing by extruding a continuous molten thermoplastic ribbon and wrapping said ribbon around a mandrel in successive and partially overlapping adjacent convolutions to form said tubing having an inclined spiral rib extending along the exterior surface thereof the improvement comprising:

directing said tubing into a passageway extending between a plurality of elongated rotatable rollers each of which overlie a plurality of adjacent rib convolutions, maintaining contact of said rollers only on said rib portion of said tubing surface while simultaneously rotating at least one of said rollers and wherein said rollers each extend along and rotate about an axis having an angle of less than 90° from the inclination of said spiral rib and whereby the distance between adjacent rib convolutions on said tubing is decreased by increasing said angle and increased by decreasing said angle.

12. The method of claim 11 wherein said angle is varied by moving one end of each of said rollers.

* * * * *